(12) United States Patent
Boyle et al.

(10) Patent No.: US 11,433,681 B2
(45) Date of Patent: Sep. 6, 2022

(54) SEALING TAPE FOR ORGANIC SOLVENT-BASED FLUIDIC CARTRIDGES

(71) Applicant: Funai Electric Co., Ltd., Osaka (JP)

(72) Inventors: Jacob Boyle, Lexington, KY (US); Paul W. Dryer, Lexington, KY (US); David C. Graham, Lexington, KY (US); Sean T. Weaver, Lexington, KY (US)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 17/196,136

(22) Filed: Mar. 9, 2021

(65) Prior Publication Data

US 2021/0213745 A1    Jul. 15, 2021

Related U.S. Application Data

(63) Continuation-in-part of application No. 16/741,812, filed on Jan. 14, 2020, now Pat. No. 10,987,935.

(51) Int. Cl.
*B41J 2/175* (2006.01)
*C09J 11/06* (2006.01)
*C09J 183/04* (2006.01)

(52) U.S. Cl.
CPC ....... *B41J 2/17536* (2013.01); *B41J 2/17503* (2013.01); *B41J 2/17533* (2013.01); *C09J 11/06* (2013.01); *C09J 183/04* (2013.01); *C09J 2467/00* (2013.01)

(58) Field of Classification Search
CPC .... B41J 2/17533; B41J 2/17536; C09J 11/06; C09J 183/04; C09J 183/06; C09J 183/08
See application file for complete search history.

(56) References Cited

U.S. PATENT DOCUMENTS

| 5,781,208 | A | 7/1998 | Karita et al. | |
| 7,540,584 | B2 | 6/2009 | Bertelsen et al. | |
| 2009/0155596 | A1 | 6/2009 | Kropp et al. | |
| 2010/0255205 | A1* | 10/2010 | Cray | C08K 5/541 |
| | | | | 524/506 |
| 2012/0098885 | A1 | 4/2012 | Harada et al. | |
| 2018/0111381 | A1 | 4/2018 | Komplin | |
| 2018/0194975 | A1* | 7/2018 | Yamanari | C09J 7/385 |

FOREIGN PATENT DOCUMENTS

| CN | 108285748 A | * | 7/2018 | ............. C09J 11/06 |
| JP | 584925 A | | 4/1993 | |
| JP | H0584925 A | * | 4/1993 | |

* cited by examiner

*Primary Examiner* — Matthew Luu
*Assistant Examiner* — Kendrick X Liu
(74) *Attorney, Agent, or Firm* — David E. Larose

(57) ABSTRACT

A fluidic ejection cartridge and protective tape therefor. The cartridge includes a cartridge body for an organic solvent-based fluid having a cover closing a first end thereof, an ejection head on a second end thereof and side walls attached to the first and second ends between the first and second ends. The side walls include a first side wall, a second side wall opposite the first side wall, a first end wall attached to the first and second side walls, and a second end wall opposite the first end wall attached to the first and second side walls. A removable tape is attached to a nozzle plate of the ejection head and to a portion of the first side wall. The removable tape contains a polymeric backing film and a glass-filled, platinum-cured silicone adhesive. The glass-filled, platinum-cured silicone adhesive is cross-linked with silane and a second cross-linking agent.

20 Claims, 5 Drawing Sheets

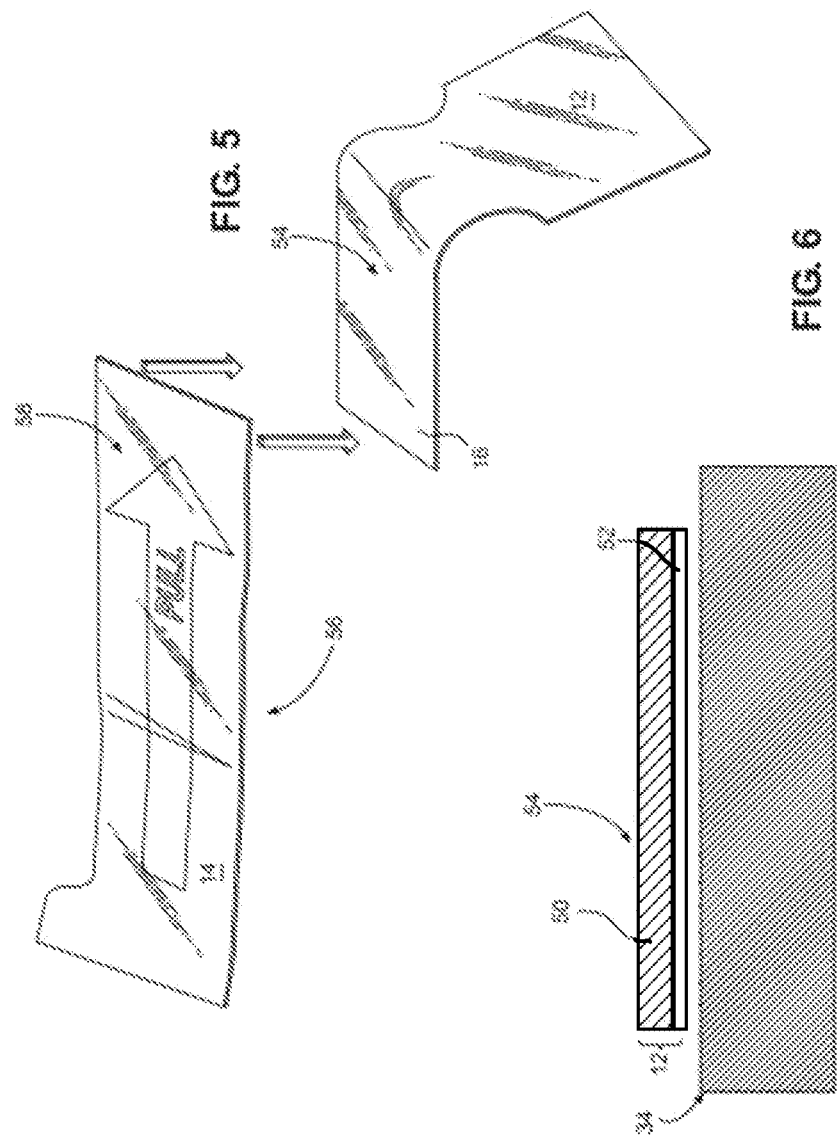

SEALING TAPE FOR ORGANIC SOLVENT-BASED FLUIDIC CARTRIDGES

RELATED APPLICATION

This application is a continuation-in-part of application Ser. No. 16/741,812, filed Jan. 14, 2020, now allowed

TECHNICAL FIELD

This disclosure relates to the field of fluidic ejection cartridges. More particularly, this disclosure relates to an improved sealing tape for use on fluidic ejection cartridges that contain organic solvents.

BACKGROUND

Fluidic ejection cartridges may be used in variety of applications, including for instance inkjet printing applications, medicinal fluid delivery applications, and vapor delivery applications. The amount of time such cartridges remain in transit from the manufacture and/or in storage (prior to installation and use) may constitute a large portion of the lifecycle of the cartridge. In some instances, the shipping and storage time may even constitute the majority of the lifecycle of the cartridge. Consequently, it is important that the operability of the cartridge not degrade during storage, even if the cartridge remains in storage for an extended period of time.

During shipping and storage of the fluidic ejection cartridges, a protective sealing tape or a plastic cover containing a resilient seal is used to cover the ejection head and ejection nozzles on the ejection head. The plastic cover containing a resilient seal is about 10 times more expensive than the protective sealing tape. Both the plastic cover and the sealing tape are designed to prevent contamination of the ejection head, prevent seepage of fluid from the ejection head, and reduce the amount of solvent evaporated from the fluid in the cartridge during shipping and storage of the cartridge. Prior to use, the plastic cover or sealing tape is removed from the fluidic ejection cartridge to expose the ejection nozzles.

Conventional pressure sensitive adhesive (PSA) sealing tapes that are used to seal the nozzle holes in an ejection head typically contain an acrylic adhesive with a polyvinyl chloride or polyethylene terephthalate backing film. However, when the fluidic cartridge contains an organic solvent rather than an aqueous-based fluid, the acrylic adhesives in conventional sealing tapes may be solubilized by the organic solvent causing fluid leakage from the fluidic ejection cartridge and/or premature peeling of the tape from the ejection head.

In order to assure that the protective sealing tape does not prematurely peel off of the ejection head, a suitable tape and adhesive system must be found that will not be readily solubilized by the organic solvents present in the fluidic ejection cartridge. The sealing tape must also be stable when exposed to heat during shipping and storage, and capable of being completely removed from the ejection head without leaving an adhesive residue. Accordingly, what is needed is an improved pressure sensitive adhesive tape sealing system that can be used with fluidic ejection cartridges that contain organic solvents rather than aqueous-based fluids.

SUMMARY

With regard to the foregoing, an embodiment of the disclosure provides a fluidic ejection cartridge and protective tape therefor. The fluidic ejection cartridge includes a cartridge body for an organic solvent-based fluid having a cover closing a first end thereof, an ejection head on a second end thereof opposite the first end, and side walls attached to the first and second ends between the first and second ends. The side walls include a first side wall, a second side wall opposite the first side wall, a first end wall attached to the first and second side walls, and a second end wall opposite the first end wall attached to the first and second side walls. A removable tape is attached to a nozzle plate of the ejection head and to a portion of the first side wall. The removable tape contains a polymeric backing film and a glass-filled, platinum-cured silicone adhesive. The glass-filled, platinum-cured silicone adhesive is cross-linked with silane and a second cross-linking agent.

In another aspect, the disclosure provides a method for improving the sealing of a nozzle plate of an ejection head attached to a fluidic ejection cartridge containing an organic solvent-based fluid. The method includes providing a cartridge body for the organic solvent-based fluid having a cover closing a first end thereof, the ejection head on a second end thereof opposite the first end, and side walls attached to the first and second ends between the first and second ends. The side walls include a first side wall, a second side wall opposite the first side wall, a first end wall attached to the first and second side walls, and a second end wall opposite the first end wall attached to the first and second side walls. A removable tape is attached to the nozzle plate of the ejection head and to a portion of the first side wall. The removable tape includes a polymeric backing film and a glass-filled, platinum-cured silicone adhesive. The removable tape is heat treated on the nozzle plate at a temperature ranging from about 50 to about 70° C.; and then the cartridge body is filled with the organic solvent-based fluid.

In a further aspect, the disclosure provides a method for making an improved protective tape for a nozzle plate of an ejection head. The method includes cross-linking a glass-filled, platinum-cured silicone adhesive with a second cross-linking agent to provide a highly cross-linked silicone adhesive. The highly cross-linked silicone adhesive is applied to a polymeric backing film to provide the improved protective tape for the nozzle plate.

In some embodiments, the polymeric backing film is polyethylene terephthalate (PET).

In some embodiments the second cross-linking agent is selected from trimethoxysilane and an epoxide.

In some embodiments, the platinum-cured silicone adhesive has a thickness on the polymeric backing film ranging from about 15 to about 50 microns and the polymeric backing film has a thickness ranging from about 40 to about 100 microns.

In some embodiments, the polymeric backing film is a corona-treated polymeric backing film.

In some embodiments, the glass-filled, platinum-cured silicone adhesive further contains an anchorage additive. In other embodiments, the anchorage additive is 2-(3,4-epoxycyclohexyl)ethyltrimethoxysilane.

A particular advantage of the embodiments of the disclosure is that the removable tape is effective to cover and seal the nozzle plate of an ejection head for a fluidic cartridge containing an organic solvent-based fluid for an extended period of time during shipping and storage of the fluidic cartridge.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein:

FIG. 5 are perspective view, not to scale, of a protective sealing tape and pull tape for protecting the ejection head of the fluidic ejection cartridge of FIG. 1.

FIG. 6 is a cross-sectional view, not to scale, of the protective sealing tape of FIG. 5 for attaching to a side wall of the fluidic cartridge.

DETAILED DESCRIPTION

Figure 1:
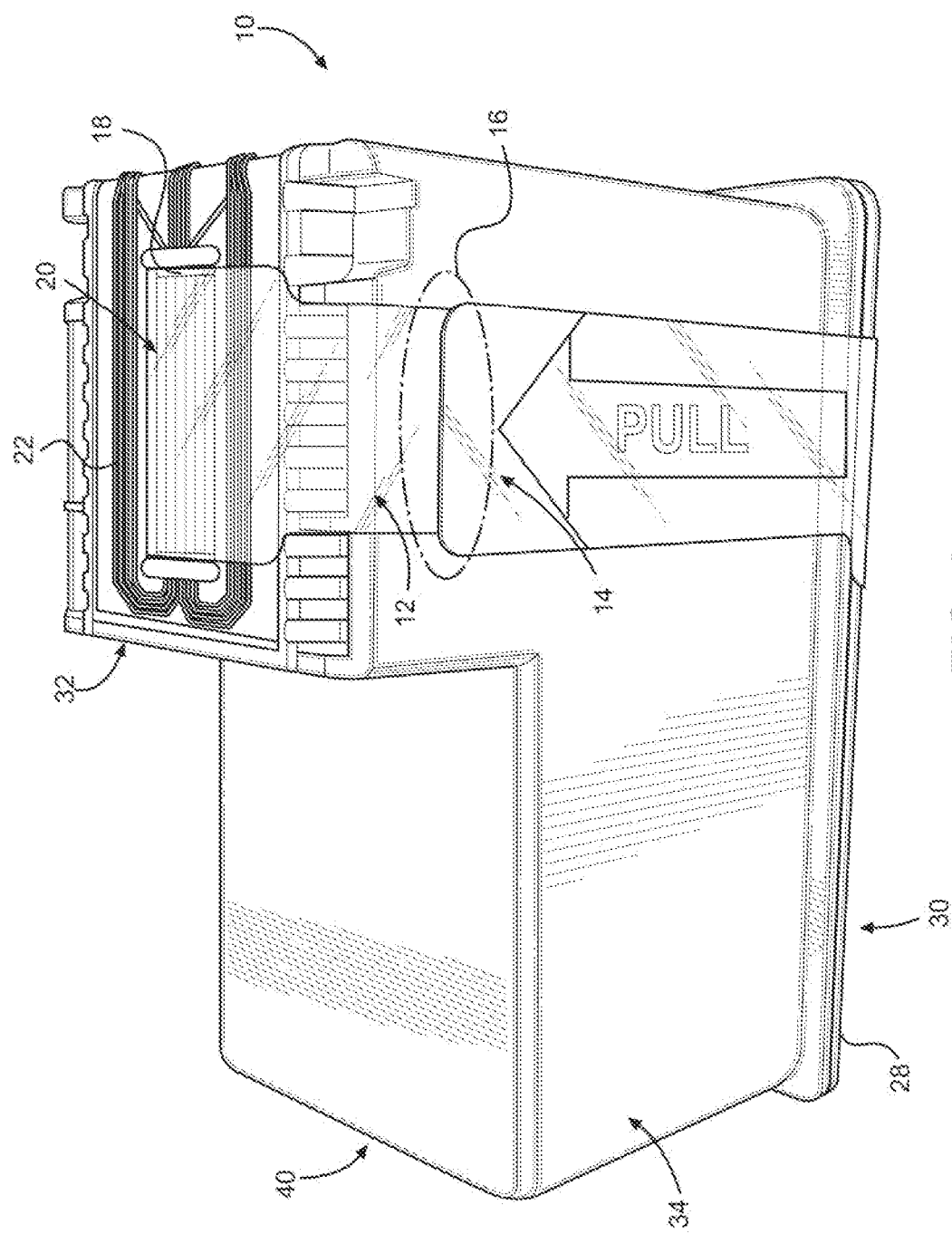
FIG. 1 is a side perspective view of a fluidic ejection cartridge according to an embodiment of the disclosure.

With reference to FIG. 1, there is shown a fluidic cartridge 10 containing a protective sealing tape 12 and a pull tape 14 overlapping a portion 16 of the protective sealing tape 12. The protective sealing tape 12 is used to cover a nozzle plate 18 of an ejection head 20 attached to the fluidic cartridge 10. The protective sealing tape 12 prevents contamination and damage to the ejection head 20, and seals nozzle holes in the nozzle plate 18 so that fluid in the fluidic cartridge 10 does not leak out or dry out and plug the nozzle holes during shipping and storage of the fluidic cartridge 10.

Figure 2:
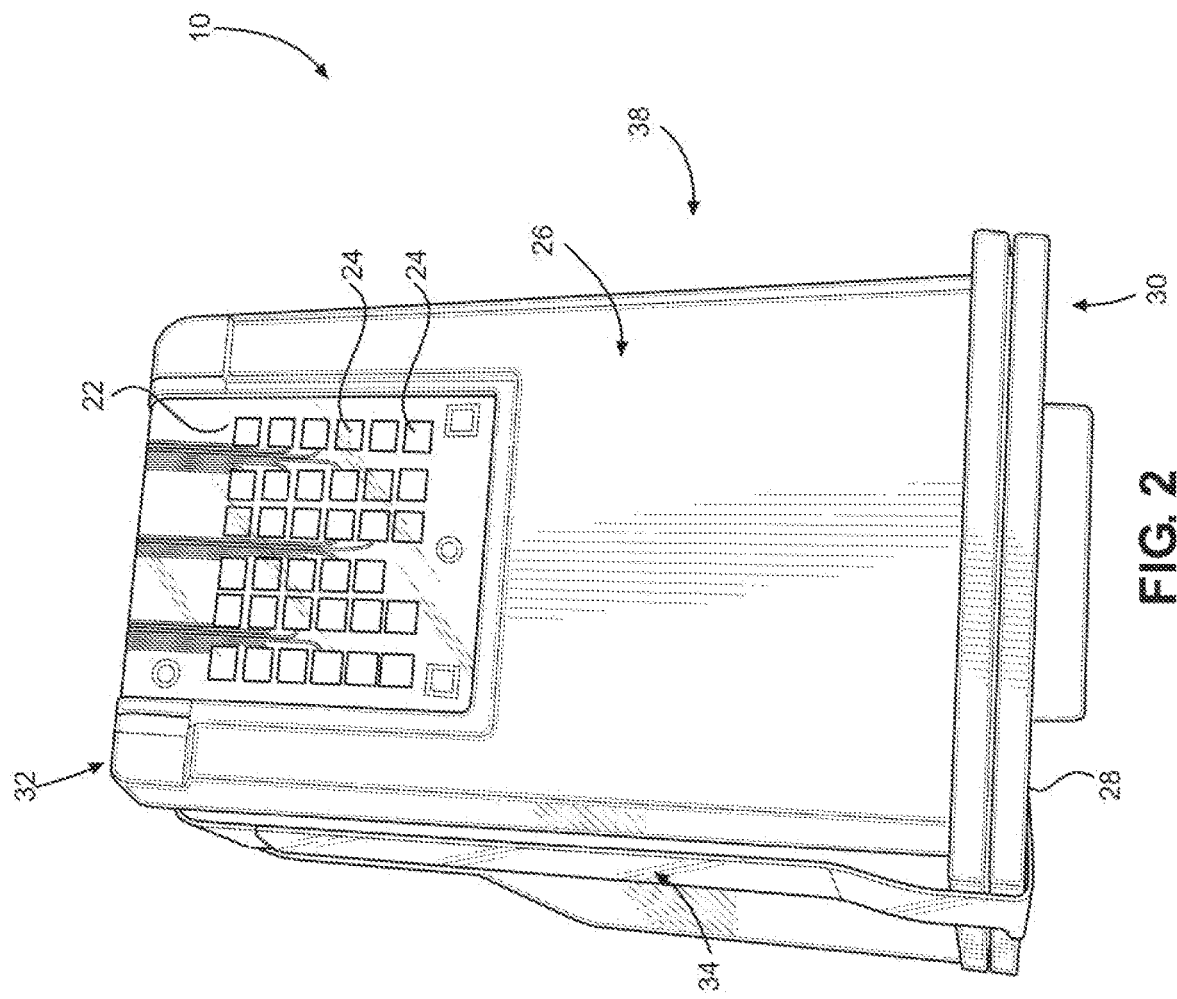
FIG. 2 is an end perspective view of the fluidic ejection cartridge of FIG. 1.
Figure 3:
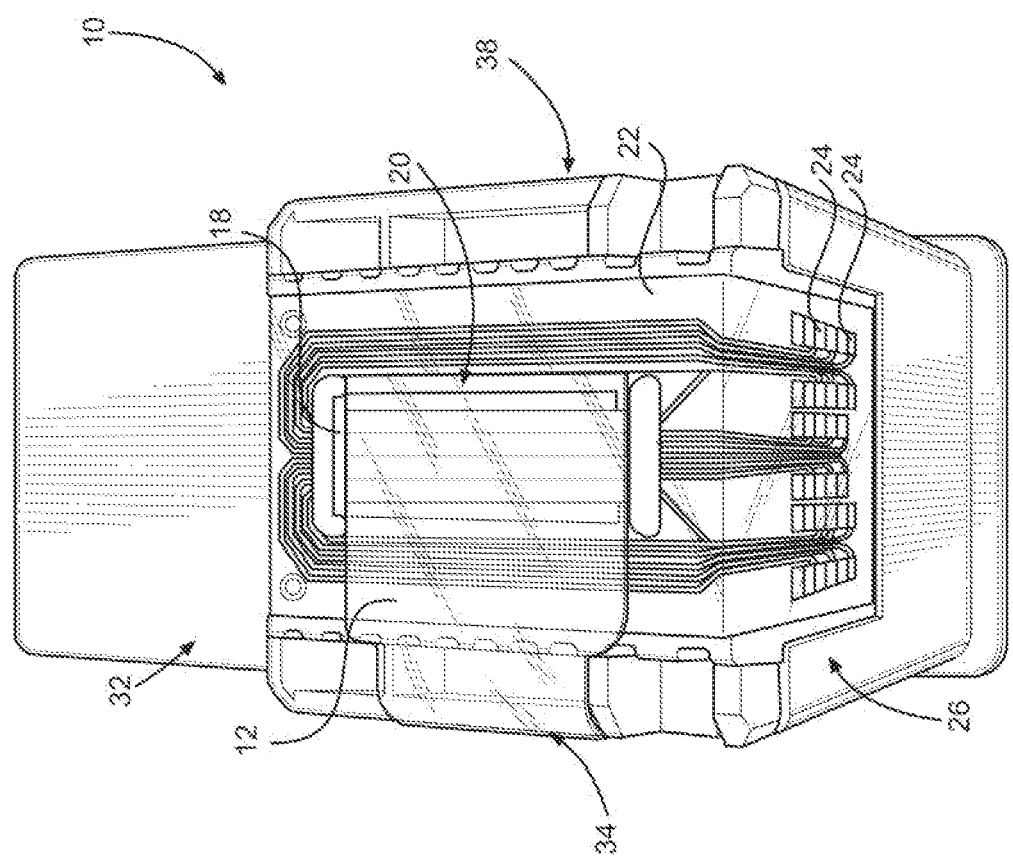
FIG. 3 is a top perspective view of an ejection head for the fluidic ejection cartridge of FIG. 1.

As shown in FIG. 2, a flexible circuit 22 is electrically connected to the ejection head 20 to control ejection of fluid from the fluidic cartridge 10 when the fluidic cartridge 10 is in use. The flexible circuit has electrical contacts 24 thereon that are disposed on a first end wall of the fluidic cartridge 10 for electrical connection to fluid ejection device, such as a printer, inhaler, E-cigarette, and the like. A cover 28 is attached to a first end 30 of the fluidic cartridge 10 opposite a second end 32 of the fluidic cartridge that contains the ejection head 20. The pull tape 14 and protective sealing tape 12 are removably attached to a first side wall of the fluidic cartridge (FIG. 1). The fluidic cartridge 10 also contains a second side wall 38 opposite the first side wall 34 and a second end wall 40 opposite the first end 30 thereof.

Before the cartridge 10 is installed and used in the fluid ejection device, the pull tape 14 is peeled away from the first side wall 34 of the fluidic cartridge 10 by grasping a tab on one end of the pull tape 14 and pulling the pull tape 14 away from the first side wall 34 of the fluidic cartridge 10. As the pull tape 14 is removed from the fluidic cartridge 10, the protective sealing tape 12, attached to the pull tape 14 in the overlapping area 16, is also removed from the fluidic cartridge 10 so that fluid can then be ejected from the ejection head 20.

Figure 4:
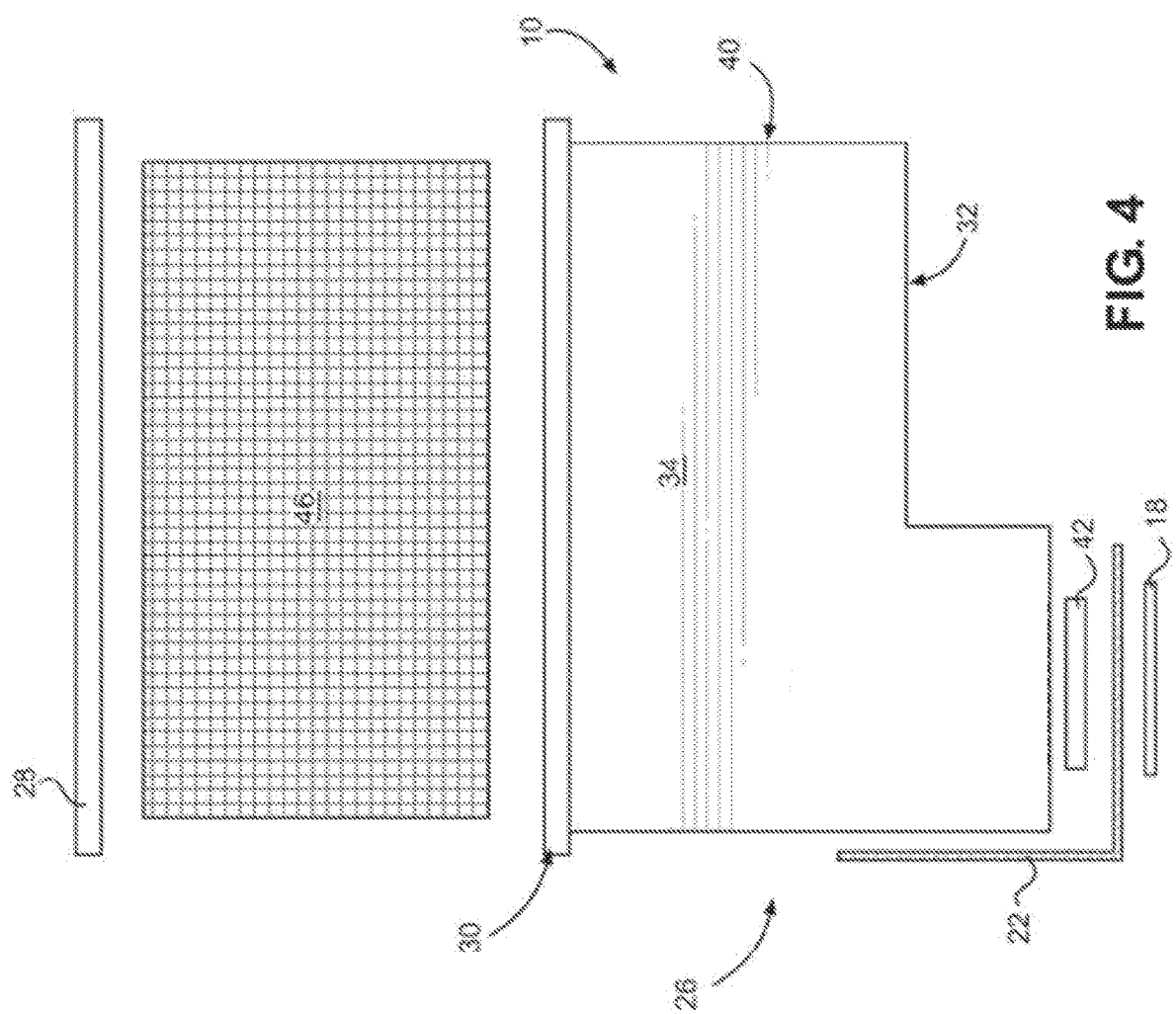
FIG. 4 is a schematic exploded view, not to scale, of the fluidic ejection cartridge of FIG. 1.

Further details of the fluidic cartridge 10 may be seen in an exploded view of the fluidic cartridge 10 illustrated schematically in FIG. 4. The ejection head 20 includes a semiconductor substrate 42 to which the flexible circuit 22 is electrically attached and the nozzle plate 18 attached to the semiconductor substrate 42 in a window (not shown) of the flexible circuit 22. In some embodiments, the fluidic cartridge 10 is filled with an open cell foam material 46 that holds fluid to be ejected from the ejection head 20 and provides a backpressure on the fluid to reduce drooling of fluid from the ejection head 20.

In embodiments described herein, the protective sealing tape 12 is used to cover and protect nozzle holes on the nozzle plate 18 as described above. The protective sealing tape 12 is shown in FIGS. 5 and 6 and is tape 12 having an overall thickness of from about 45 to about 150 microns. The protective sealing tape 12 has a base film layer, or backing film 50 of polyethylene terephthalate, polypropylene, polyethylene, polybutene, polybutadiene, polymethyl pentene, polybutylene terephthalate, polyurethane, ethylene-vinyl acetate copolymer, ionomer resin, ethylene-(meth)acrylic acid copolymer, ethylene-alkyl meth(acrylate) copolymer, polystyrene, polyimide, polyamide, or polycarbonate having a thickness of from about 20 to about 80 microns such as from about 25 to about 75 microns and an adhesive layer 52 on one side thereof having a thickness of from about 15 to about 45 microns. A particularly preferred polymeric backing film is polyethylene terephthalate.

The adhesive layer 52 has a peel strength that is desirably in the range from about 170 to about 350 Newton per meter (N/m) on a silicon wafer as determined using a 20-millimeter-wide sample at a peeling speed of 300 mm/min and at an angle of 90 degrees. It is important that adhesive layer 52 of the protective sealing tape 12 contain a low amount of impurities since it is in intimate contact with the nozzle plate 18 and could contaminate the nozzle holes in the nozzle plate thereby blocking the nozzle holes from functioning properly.

The pull tape 14 is attached in the overlap area 16 to a backside 54 of the protective sealing tape 12. The pull tape can be made of a wide variety of materials provided the adhesive used on an underside 56 of the pull tape 14 has a peel strength of about 2 times greater and desirably at least about 3 time greater than the peel strength of the protective sealing tape 12. In some embodiments, the pull tape 14 has a peel strength of greater than about 120 N/m, such as greater than about 140 N/m, and desirably greater than about 200 N/m. The pull tape 14 is also attached to the first side wall 34 of the cartridge 10 adjacent to the protective sealing tape 12.

It will be appreciated that the ejection head 20 with its semiconductor substrate 42 and nozzle plate 18 is a precisely manufactured device that is capable of high resolution fluid ejection. Accordingly, protection of the ejection head 20 is important for the proper operation of the fluid ejection device. As shown in FIG. 1, the protective sealing tape 12 is applied to the ejection head 20 and the first side wall 34 of the fluidic ejection cartridge 10 and the pull tape 14 is applied to the first side wall 34 of the fluidic ejection cartridge 10 adjacent an end of the protective sealing tape 12. Thus, the protective sealing tape 12 may be peeled from the ejection head 20 in a direction that is orthogonal to a longitudinal direction of the nozzle plate 18 and substrate 42. Such peeling direction is effective to reduce stresses that may occur to the ejection head 20 when the protective sealing tape 12 is peeled therefrom and reduces the likelihood that the nozzle plate 18 will delaminate from the substrate 42. Accordingly, it is desirable that the protective sealing tape 12 be peeled in the orthogonal direction rather that in a longitudinal direction with respect to the ejection head.

As shown in FIGS. 1 and 5 it is important that the pull tape 14 overlap the backside 54 of the protective sealing tape 12 to improve the removal of the protective sealing tape 12 from the cartridge 10. Also, since the protective sealing tape 12 has a lower peel strength than the pull tape 14, overlapping the protective sealing tape 12 on a backside 58 of the pull tape 14 may lead to separation of the protective sealing tape 12 from the pull tape 14 and thus result in incomplete removal of the protective sealing tape 12 from the ejection head 20.

The adhesive material used on the underside 56 of the pull tape 14 is not particularly critical to the disclosed embodiments. Accordingly, the pull tape adhesive may be a pressure sensitive adhesive selected from various radiation curable polymers such as epoxy, diolefin, urethane, polyimide, acrylic, silicone and vinyl ester polymers including a polymerization initiator. Examples of acrylic polymers which may be used include homopolymers or copolymers of an alkyl (meth)acrylate, and copolymers of (meth)acrylate and another copolymerizable monomer such as a hydroxyalkyl (meth)acrylate, glycidyl(meth)acrylate, (meth)acrylic acid, itaconic acid, maleic anhydride, (meth)acrylic amide, (meth) acrylic N-hydroxymethylamide, an alkylaminoalkyl(meth) acrylate, silicone adducted acrylate, vinyl acetate, styrene, or acrylonitrile. In addition to the acrylic and epoxy adhesive materials, polyimide and silicone based materials may also be used as base materials for the pressure sensitive adhesive layer on the underside 56 of the pull tape 14.

It is also important that the adhesive layer 52 of the protective sealing tape 12 be resistant to organic solvents of the organic solvent-based fluid in the fluidic cartridge 10. Initial studies found that silicone-based adhesives were the most resistant to the very harsh solvents used in commercial and industrial ink. There are 2 types of silicone resins used to make silicone adhesives. The most common silicone resin uses a benzoyl peroxide (BPO) catalyst. These resins have excellent high temperature properties, tack, and adhesion. Unfortunately, solvents can react with the crosslinking reaction which breaks down the adhesive. The other type of silicone resin is the platinum-cured silicone. The platinum-cured silicone resin is less common because it is more expensive and can be poisoned easily if not properly processed. However, the platinum-cured silicone resin is more resistant to solvent attack. It was observed that the platinum-cured silicone resin adhesive tapes were the only adhesive materials compatible with the solvent based systems. To further improve the cohesive properties of the adhesive, glass fibers were added to the resin.

A particularly suitable platinum-cured silicone adhesive comprises a glass-filled mixture of vinyl functional polydimethylsiloxane and silicone resin in toluene and xylene. A suitable platinum-cured silicone adhesive has an adhesion characteristic ranging from above about 4 g/cm to less than about 300 g/cm, and particularly in the range of from about 40 g/cm to about 250 g/cm and is does not dissolve in methyl ethyl ketone, ethanol, or methanol.

Accordingly, it was found, quite surprisingly, that only the glass-filled platinum-cured silicone adhesive was effective for use for sealing cartridges 10 containing organic solvent-based fluids. Suitable protective sealing tapes 12 include the platinum-cured silicone based adhesive for contact and sealing of nozzle holes in the nozzle plate 18. In particular, the adhesive layer 52 is suitably a glass filled platinum-cured silicone adhesive layer 52. Such glass filled platinum-cured silicone adhesive materials have been found to be particularly resistant to organic solvent-based fluids thereby maintaining a peel strength for a prolonged period of time while being exposed to the organic solvent-based fluid in the cartridge 10. Conventional adhesives, such as acrylic adhesive, peroxide-catalyzed silicone adhesive, natural and synthetic rubber based adhesive, and hot melt adhesives fail to maintain suitable peel strength, and/or fail to remain in place on the nozzle plate despite relatively high initial peel strengths as shown by the following examples.

The silicone adhesive is made by cross-linking a silane group of polydimethylsiloxane with a vinyl end-capped polydimethylsiloxane, a platinum catalyst and heat to provide the glass-filled, platinum-cured silicone adhesive according to the following formula (I):

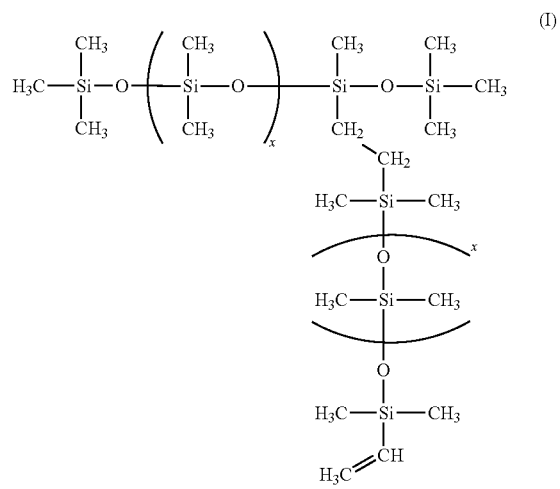

Nevertheless, it was discovered that some fluids with high concentrations of methyl ethyl ketone (MEK), acetone and methanol, will degrade the glass-filled, platinum-cured silicone adhesive described above. In order to improve the chemical resistance of the silicone adhesive, the cross-link density of the adhesive was increased. A second cross-linking agent was used to provide silane and epoxide functional groups to the backbone of the cross-linker portion of the silicone monomers. Suitable second cross-linking agents may be selected from trimethoxysilane and epoxides.

In one embodiment, a silane cross-linker and a trimethoxy silane group is added to the polydimethoxysiloxane backbone (formula II) prior to reacting with a vinyl end-capped polydimethylsiloxane (formula III) in a first step of the reaction as shown below to provide a platinum-cured silicone adhesive (formula (IV) containing a trimethoxysilane group cross-linker.

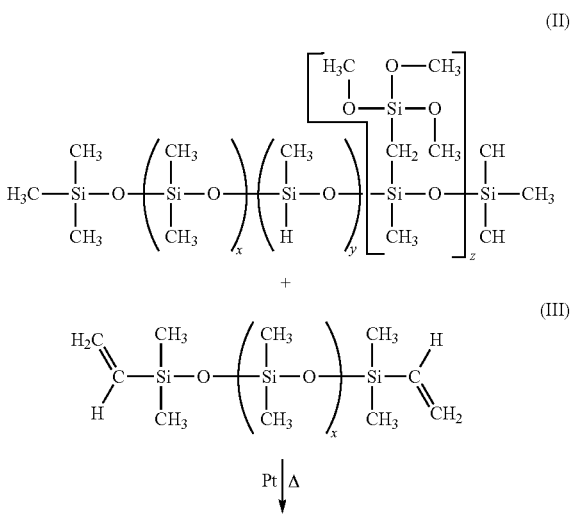

-continued

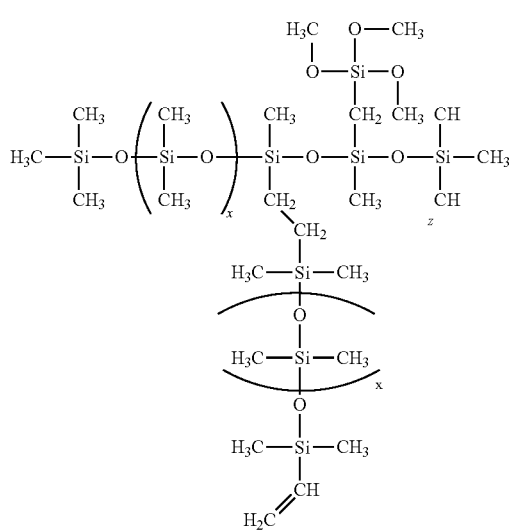

(IV)

After forming the compound of formula IV, the trimethoxysilane groups hydrolyze in moist air in step two to provide methanol and tri-hydroxy silane groups in place of the trimethoxysilane groups. The trimethoxysilane groups will react with other trimethoxysilane groups in step three to increase the crosslink density of the adhesive.

In another embodiment, the cross-link density of the platinum cured adhesive of formula I may be increased by adding an epoxide functional group (formula V) to the polydimethylsiloxane backbone. The compound of formula 5 is then reacted with the vinyl end-capped polydimethylsiloxane (formula III) as shown below to provide the compound of (formula (VI).

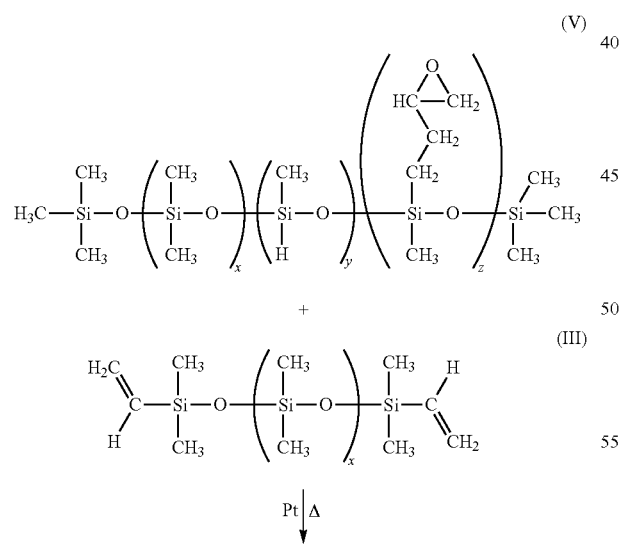

The compound of Formula (VI) is reacted in the presence of a photoacid generator and ultraviolet (UV) light which opens the epoxide rings. The photoacid generator may be selected from a compound or mixture of compounds capable of generating a cation such as an aromatic complex salt which may be selected from onium salts of a Group VA element, onium salts of a Group VIA element, and aromatic halonium salts. Examples of photoacid generators include, but are not limited to, tri phenyl sulfonium tetrafluoroborate, tri phenyl sulfonium hexafluorophosphate, tri phenyl sulfonium hexafluoroantimonate, tritolysulfonium hexafluorophosphate, anisyldiphenylsulfonium hexafluoroantimonate, 4-butoxyphenyldiphenylsulfonium tetrafluoroborate, 4-chlorophenyldiphenylsulfonium hexafluoroantimonate, 4-acetoxy-phenyldiphenylsulfonium tetrafluoroborate, 4-acetamidophenyldiphenylsulfonium tetrafluoroborate, diphenyliodonium trifluoromethanesulfonate, (p-tert-butoxyphenyl)phenyliodonium trifluoromethanesulfonate, diphenyliodonium p-toluenesulfonate, (p-tert-butoxyphenyl)-phenyliodonium p-toluenesulfonate, bis(4-tert-butylphenyl)iodonium hexafluorophosphate, and diphenyliodonium hexafluoroantimonate. The amount of photoacid generator in the reactive formulation may range from about 1 to about 4 percent by weight based on a total weight of the adhesive formulation. The epoxide groups react with other epoxide groups to provide a highly cross-linked compound of formula VII. The epoxide groups may also react with SiOH groups and amine functional groups.

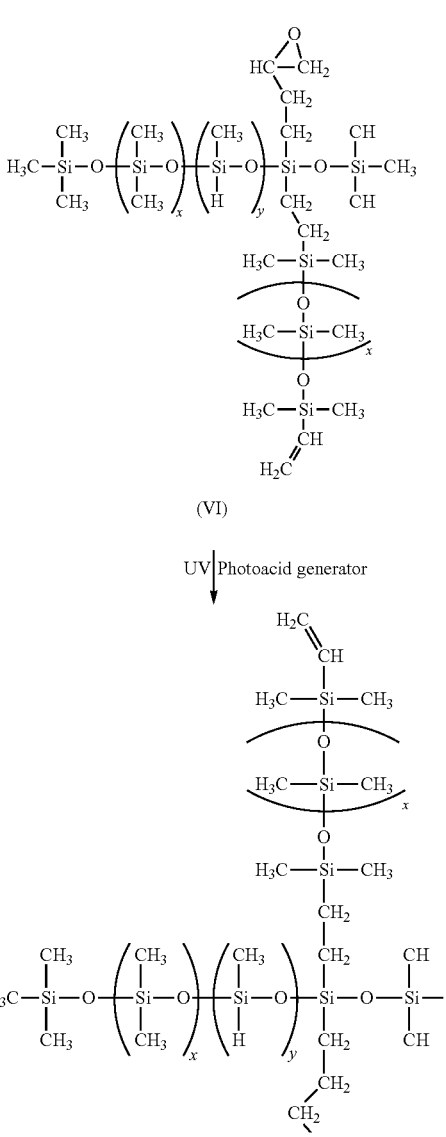

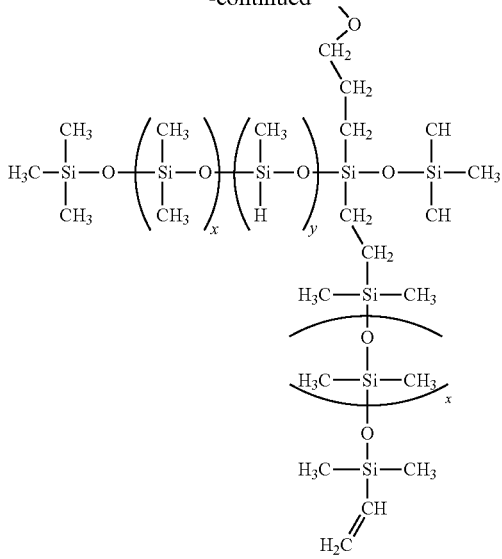

(VII)

The foregoing highly cross-linked glass-filled, platinum cured adhesives are highly resistant to organic solvents and provide a significantly improved adhesive tape for sealing the fluid jet ejection heads. The foregoing platinum-cured silicone adhesives were found to withstand the harsh environment better than acrylics, rubbers, synthetic rubbers, acrylic/rubber hybrids, or hot melt adhesives.

Another problem with adhesive tapes for sealing fluid jet ejection heads is that some of the organic fluids in the ejection heads cause the polymeric backing film to delaminate from the adhesive. Accordingly, the delaminated adhesive remains on the nozzle plate which causes clogged or blocked nozzles. In order to improve the adhesion of the adhesive to the polymeric backing film, a corona treatment of the backing film is performed prior to coating the adhesive material on the backing file. Additionally, an anchorage material is added to the highly cross-linked adhesive formulation to improve the adhesion between the adhesive and the polymeric backing film. A suitable anchorage additive is 2-(3,4-epoxycyclohexyl)ethyltrimethoxysilane available from Dow Chemical Company under the tradename of 9176. The amount of anchorage additive in the adhesive formulation may range from about 0.2 to about 0.4 percent by weight based on a total weight of the adhesive formulation.

Another problem associate with conventional sealing tapes having a polyethylene terephthalate backing film is that exposure to heat above about 50° C. over a prolonged period of time such as over 4 to 6 weeks causes deformation of the polyethylene terephthalate backing film. Deformation of the backing film can cause the tape to pull away from the nozzle plate and allow fluid to leak from the fluidic ejection cartridge. Deformation of the backing film also causes the silicone adhesive to delaminate from the backing film. As set forth above, if the adhesive remains on the nozzle plate, the adhesive will block or clog the nozzles preventing the ejection head from jetting fluid therefrom.

In order to solve the deformation problems associated with polyethylene terephthalate backing films, the fluidic ejection cartridge containing the protective tape on the nozzle plate is pre-heated above the glass transition temperature of polyethylene terephthalate (about 70° C.) prior to filling the fluidic ejection cartridge with fluid. The pre-heating step is believed to cause the protective tape to move and conform the shape of the ejection head and cartridge. Accordingly, it is believed that if the fluidic ejection cartridge is again exposed to heat for a prolonged period of time, no further deformation of the protective tape will occur as demonstrated by the following examples.

In the following tests two different organic perfumes were used to test the adhesion of the protective tape on fluidic ejection cartridges. Ten fluidic ejection cartridges were used in each test. In test numbers 2 and 4, the fluidic ejection cartridges were pre-heated at 60° C. for 2 hours then filled with the indicated perfume. All of the test fluidic cartridges were then aged at a temperature of 50° C. for three hours to determine if the fluidic cartridges would leak. The results are shown in the following table.

| Test No. | Perfume | Pre-heat | No. of Leakers | % Leakers |
|---|---|---|---|---|
| 1 | Mid Porn | None | 4 | 40 |
| 2 | Mid Porn | 2 hrs @ 60° C. | 0 | 0 |
| 3 | Honey Blossom | None | 5 | 50 |
| 4 | Honey Blossom | 2 hrs @ 60° C. | 0 | 0 |

The foregoing results show that pre-heating the protective tape on the fluidic ejection cartridge prior to filling the cartridge with fluid greatly improved the conformity of the protective tape to the cartridge thereby preventing fluid leakage when exposed to heat during shipping and storage.

The fluidic ejection cartridges 10, described above, may be used in variety of applications, including for instance inkjet printing applications. Fluidic ejection cartridges may also be used for other nonprinting applications as well, particularly for applications calling for the precise metering of small amounts of liquid materials and vaporous materials. For example, the ejection cartridges described herein may be used in the preparation of cosmetics, paints, or lubricants and in the ejection of liquids and vapors for medical treatment.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A fluidic ejection cartridge and protective tape therefor, comprising:
    a cartridge body for an organic solvent-based fluid having a cover closing a first end thereof, an ejection head on a second end thereof opposite the first end, and side walls attached to the first and second ends between the first and second ends, wherein the side walls comprise a first side wall, a second side wall opposite the first side wall, a first end wall attached to the first and second side walls, and a second end wall opposite the first end wall attached to the first and second side walls; and a removable tape attached to a nozzle plate of the ejection head and to a portion of the first side wall, wherein the removable tape comprises a polymeric backing film and a glass-filled, platinum-cured silicone adhesive, wherein the glass-filled, platinum-cured silicone adhesive is cross-linked with silane and a second cross-linking agent.

2. The fluidic ejection cartridge of claim 1, wherein the polymeric backing film comprises polyethylene terephthalate (PET).

3. The fluidic ejection cartridge of claim 1, wherein the second cross-linking agent is selected from the group consisting of trimethoxysilane and an epoxide.

4. The fluidic ejection cartridge of claim 1, wherein the platinum-cured silicone adhesive has a thickness on the polymeric backing film ranging from about 15 to about 50 microns and the polymeric backing film has a thickness ranging from about 40 to about 100 microns.

5. The fluidic ejection cartridge of claim 1, wherein the polymeric backing film comprises a corona-treated polymeric backing film.

6. The fluidic ejection cartridge of claim 5, wherein the glass-filled, platinum-cured silicone adhesive further comprises an anchorage additive.

7. The fluidic ejection cartridge of claim 6, wherein the anchorage additive comprises 2-(3,4-epoxycyclohexyl)ethyltrimethoxysilane.

8. A method for improving the sealing of a nozzle plate of an ejection head attached to a fluidic ejection cartridge containing an organic solvent-based fluid, the method comprising:
providing a cartridge body for the organic solvent-based fluid having a cover closing a first end thereof, the ejection head on a second end thereof opposite the first end, and side walls attached to the first and second ends between the first and second ends, wherein the side walls comprise a first side wall, a second side wall opposite the first side wall, a first end wall attached to the first and second side walls, and a second end wall opposite the first end wall attached to the first and second side walls;
attaching a removable tape to the nozzle plate of the ejection head and to a portion of the first side wall, wherein the removable tape comprises a polymeric backing film and a glass-filled, platinum-cured silicone adhesive;
heat-treating the removable tape on the nozzle plate at a temperature ranging from about 50 to about 70° C.; and
filling the cartridge body with the organic solvent-based fluid.

9. The method of claim 8, wherein the polymeric backing film comprises polyethylene terephthalate.

10. The method of claim 8, wherein the glass-filled, platinum-cured silicone adhesive is cross-linked with silane and a second cross-linking agent.

11. The method of claim 10, wherein the second cross-linking agents is selected from the group consisting of trimethoxysilane and an epoxide.

12. The method of claim 8, wherein the glass-filled, platinum-cured silicone adhesive is formulated with an anchorage additive.

13. The method of claim 12, wherein the anchorage additive comprises 2-(3,4-epoxycyclohexyl)ethyltrimethoxysilane.

14. A method for making an improved protective tape for a nozzle plate of an ejection head comprising,
cross-linking a glass-filled, platinum-cured silicone adhesive with a second cross-linking agent to provide a highly cross-linked silicone adhesive; and
applying the highly cross-linked silicone adhesive to a polymeric backing film to provide the improved protective tape for the nozzle plate.

15. The method of claim 14, wherein the second cross-linking agent is selected from the group consisting of trimethoxysilane and an epoxide.

16. The method of claim 14, further comprising formulating the highly cross-linked silicone adhesive with an anchorage additive.

17. The method of claim 16, wherein the anchorage additive comprises 2-(3,4-epoxycyclohexyl)ethyltrimethoxysilane.

18. The method of claim 16, further comprising corona treating the polymeric backing film prior to applying the highly cross-linked silicone adhesive to the polymeric backing film.

19. The method of claim 14, wherein the polymeric backing film comprises polyethylene terephthalate.

20. The method of claim 14, wherein the highly cross-linked silicone adhesive has a thickness on the polymeric backing film ranging from about 15 to about 50 microns and the polymeric backing film has a thickness ranging from about 40 to about 100 microns.

* * * * *